United States Patent Office 3,209,812
Patented Oct. 5, 1965

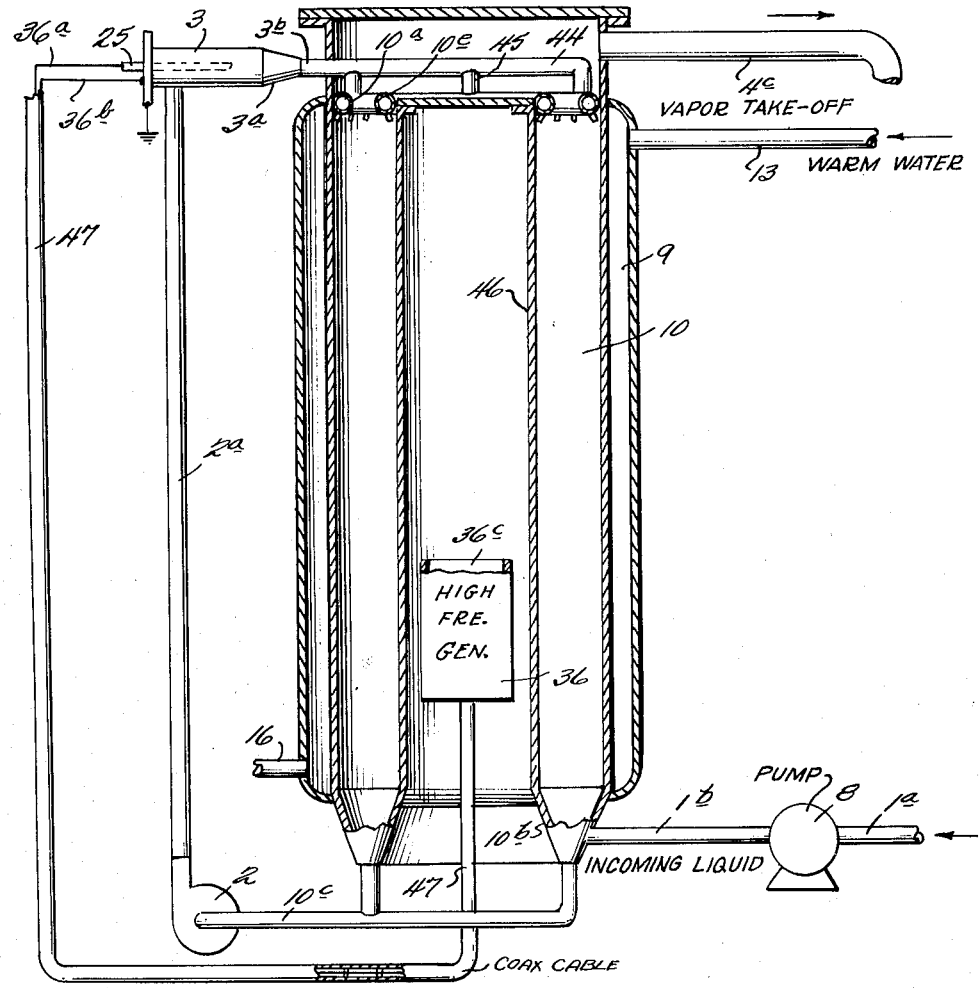

3,209,812
APPARATUS FOR REMOVING WATER FROM LIQUID MIXTURES
Ralph G. Sargeant, 408 W. Windsor St., Lakeland, Fla.
Original application Sept. 22, 1959, Ser. No. 841,478, now Patent No. 3,072,490, dated Jan. 3, 1963. Divided and this application May 24, 1962, Ser. No. 198,687
2 Claims. (Cl. 159—13)

The present application is a division of my application Ser. No. 841,478, filed September 22, 1959, now Patent No. 3,072,490, issued January 3, 1963, which is a continuation-in-part of my prior, co-pending application Ser. No. 482,056, filed January 17, 1955, which application itself was a continuation-in-part of prior application Ser. No. 430,048, filed May 17, 1954, the earlier two of which are now abandoned.

This invention relates to a method of and apparatus for removing water by evaporation from liquid mixtures containing water and other components. It is particularly advantageous for use with heat sensitive liquid materials.

As examples of processes to which the invention is applicable may be mentioned the concentration of fruit juices, such as citrus juices, and the removal from hydrocarbon and other oils and liquid fuels of any water which may have become mixed therewith.

As set forth in said prior patent, the present invention is based on the use of so-called "dielectric heating," that is to say the application to the liquid being treated of very high frequency electric oscillations, having a frequency, for example, on the order of 10 to 20 megacycles, more or less.

As a measure of economy, the object of the invention is to so arrange the high frequency generator itself that the thermal energy given off therefrom may be utilized to supply additional heat to the evaporating chamber, instead of being wasted.

In order that the invention may be readily understood, reference will be had to the accompanying drawing, forming part of this specification, and in which the single figure is a schematic view of the essential equipment used in carrying out the invention.

The liquid to be treated is drawn in through pipe 1a by a centrifugal pump 8, and is delivered through pipe 1b to the bottom of the evaporating chamber.

From the lower end of the conical bottom 10b extends a pipe 10c to a centrifugal pump 2 which forces the liquid material up through a vertical pipe 2a to the top of an annular evaporating chamber 10 where it is delivered to a spray head 10a which directs the material into contact with the vertical walls of the evaporating chamber. The material then flows down these walls to the conical bottom 10b where it is again recirculated or recycled by the pump 2.

Interposed in the pipe 2a is a dielectric heating device or electrode structure 3 through which the liquids circulate. The details of the preferred form of this device are shown in FIGS. 3 to 5 of my above identified patent. It consists of a horizontally disposed cylindrical casing or shell having a restricted or tapering end 3a, discharging axially of the casing into a pipe 3b connected with the spray head 10a. Mounted at the other end of the cylindrical structure and extending axially thereof is a central electrode in the form of a rod 25, so that an annular space is provided between this rod and the cylindrical shell. This central electrode, which is shorter than the cylindrical shell, is supported wholly at one end, the other end, adjacent the discharge opening of the shell, being free.

In use, the electrode structure is connected with the two sides of a high-frequency generator 36, one side being connected through a well insulated lead 36a with the central rod 25, and the other side connected by lead 36b with the electrode shell or casing, which is grounded. Preferably, and as usual in the art, such connection is made by means of a co-axial cable 47, as indicated.

Warm water from any suitable source is preferably fed through a pipe 13 to a jacket 9, which surrounds the evaporating chamber 10. As the liquid material flows down inside of these walls, it is maintained at a relatively warm temperature by the water jacket 9 and prevented from cooling off substantially as it otherwise would do.

The high frequency generator 36 which I employ is of the well known type embodying one or more oscillating thermionic tubes. The exact frequency is not critical, but should be what is known as radio frequency. For example, a frequency of 60 cycles per second, such as ordinary house current, would not be high enough to produce the desired results. Furthermore, with such a low frequency current electrolysis is likely to occur at the inner electrode. It is thought that a frequency of anywhere within the range of 1 to 25 or more megacycles will operate satisfactorily. In practice, I have usually employed a frequency on the order of 15 to 20 megacycles.

A vacuum of at least 5 mm. of mercury is maintained in the evaporating chamber 10 and the water in the jacket 9 is regulated so as to keep the temperature of this chamber at around 75° F. When the liquid mixture is sprayed into this chamber through the spray nozzles the water present immediately flashes into steam or vapor which is drawn off through the conduit 4c. As the water vaporizes, it absorbs a large amount of heat and the water jacket 9 is necessary to supply this so-called latent heat of vaporization.

To increase the economy of the apparatus, I have shown the high frequency generator 36 as enclosed within a hollow chamber 46 in the center of an annular evaporating chamber 10. The generator 36 is connected with the electrode structure 3, by means of a co-axial cable 47. The heat developed within the generator 36 serves to warm the walls of the chamber 46, and the upper end of the generator casing is preferably open, as shown at 36c, so that the heat may freely radiate from the generator.

In this connection, the spray head preferably comprises a pair of concentric circular pipes 10a and 10e to which the juice is delivered through pipes 44 and 45, the circular pipes being so disposed as to spray the liquid against both the inner and outer walls of the annular evaporating chamber.

What I claim is:
1. Apparatus for evaporating water from liquid mixtures containing it, comprising, in combination, a closed evaporating chamber, a non-communicating hollow chamber within said evaporating chamber, an electrode structure having a passageway extending through it, means connecting said passageway with said evaporating chamber, a pump for forcing the liquid mixture through said passageway and thence into said evaporating chamber, and a high frequency generator connected with said electrode structure, said hollow chamber having an opening through which said generator may freely pass, and said high frequency generator being housed within said hollow chamber, whereby the heat given off by said generator is utilized to help maintain the desired temperature in said evaporating chamber.

2. Apparatus for evaporating water from liquid mixtures containing it, comprising, in combination, a closed evaporating chamber, a non-communicating hollow chamber within said evaporating chamber, said hollow chamber being freely accessible from outside the evaporating chamber, means for applying electrical energy to the liquid mixture being treated, outside of said evaporating chamber, and means for then delivering the liquid mixture into said evaporating chamber, said energy-applying means including a high frequency generator insertable into and removable from said hollow chamber but normally housed within the same, whereby the heat given off by said generator is utilized to help maintain the desired temperature in said evaporating chamber.

References Cited by the Examiner

UNITED STATES PATENTS

| | | | |
|---|---|---|---|
| 716,271 | 12/02 | O'Neill | 159—29 |
| 796,839 | 8/05 | Geer | 159—29 |
| 2,344,754 | 3/44 | Vang | 34—1 |
| 2,483,623 | 10/49 | Clayton | 219—10.65 |
| 2,494,716 | 1/50 | McMahon | 219—10.65 |
| 2,521,442 | 9/50 | Birdseye | 159—6 |
| 2,551,360 | 5/51 | Bierwirth | 159—6 X |
| 2,589,417 | 3/52 | Mittelmann | 219—10.65 |
| 2,632,505 | 3/53 | Peterson | 159—29 X |
| 2,704,120 | 3/55 | Peterson | 159—29 X |
| 2,764,233 | 9/56 | Skinner | 159—13 |
| 2,777,514 | 1/57 | Eckstrom. | |
| 2,873,799 | 2/59 | Earley et al. | 159—49 |
| 2,914,120 | 11/59 | Hunt et al. | 159—127 |
| 2,931,433 | 4/60 | Mertz | 159—44 X |

FOREIGN PATENTS

| | | |
|---|---|---|
| 695,595 | 8/53 | Great Britain. |
| 181,798 | 1/36 | Switzerland. |

NORMAN YUDKOFF, *Primary Examiner.*